(12) United States Patent
Matsuzaki et al.

(10) Patent No.: US 12,496,032 B2
(45) Date of Patent: Dec. 16, 2025

(54) X-RAY IMAGING APPARATUS AND X-RAY IMAGING METHOD

(71) Applicant: FUJIFILM Healthcare Corporation, Chiba (JP)

(72) Inventors: Kazuki Matsuzaki, Chiba (JP); Isao Takahashi, Chiba (JP); Keisuke Yamakawa, Chiba (JP); Tadashi Nakamura, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 194 days.

(21) Appl. No.: 18/416,918

(22) Filed: Jan. 19, 2024

(65) Prior Publication Data

US 2024/0245377 A1 Jul. 25, 2024

(30) Foreign Application Priority Data

Jan. 23, 2023 (JP) .............................. 2023-008102

(51) Int. Cl.
*A61B 6/00* (2024.01)
*A61B 6/40* (2024.01)

(52) U.S. Cl.
CPC .............. *A61B 6/52* (2013.01); *A61B 6/4007* (2013.01); *A61B 6/4476* (2013.01); *A61B 6/54* (2013.01)

(58) Field of Classification Search
CPC ....... A61B 6/4007; A61B 6/4014; A61B 6/54; A61B 2090/367; A61B 6/032; A61B 17/15; A61B 5/1121; A61B 5/1114; A61B 90/08; A61B 1/00194; A61B 2090/364; A61B 6/466; A61B 6/4441; A61B 6/4447; A61B 6/4405; A61B 8/4245; A61B 8/483; A61B 6/4028; A61B 6/4429; A61B 6/4458; A61B 8/4218; A61B 6/0407; G06T 19/20; G06T 7/55; G06T 2207/10081; G06T 2207/10116
See application file for complete search history.

(56) References Cited

U.S. PATENT DOCUMENTS

2023/0213610 A1* 7/2023 Eberspach ........... G06V 40/166

FOREIGN PATENT DOCUMENTS

JP 2013173015 9/2013
JP 2021133036 9/2021

* cited by examiner

*Primary Examiner* — Don K Wong
(74) *Attorney, Agent, or Firm* — JCIPRNET (57) ABSTRACT

Provided is an X-ray imaging apparatus that can understand a three-dimensional position of a treatment tool in real time during a medical operation without rotating a column of an X-ray tube.
A first X-ray image is acquired by irradiating a subject with X-rays from a first X-ray tube supported by a first column and detecting the X-rays transmitted through the subject by an X-ray detector. A second X-ray image is acquired by irradiating the subject with X-rays from a second X-ray tube supported by a second column at a position shifted from an optical axis of the first X-ray tube and detecting the X-rays transmitted through the subject by the X-ray detector. A position of an image of a predetermined feature part included in the first X-ray image and a position of an image of the feature part included in the second X-ray image are used to calculate a three-dimensional position of the image of the predetermined feature part.

10 Claims, 12 Drawing Sheets

X-RAY IMAGING APPARATUS AND X-RAY IMAGING METHOD

INCORPORATION BY REFERENCE

The present application claims priority from Japanese patent application JP-2023-008102 filed on Jan. 23, 2023, the content of which is hereby incorporated by reference into this application.

BACKGROUND OF THE INVENTION

1. Field of the Invention

The present invention relates to an X-ray imaging apparatus.

2. Description of the Related Art

A general X-ray imaging apparatus can perform X-ray imaging of a still image or X-ray imaging (so-called fluoroscopy) of a moving image by continuous imaging by irradiating a subject with X-rays from an X-ray source to detect the X-rays transmitted through the subject by a planar X-ray detector. X-ray images obtained in both the X-ray imaging and the fluoroscopy are two-dimensional projection images, and it is not possible to understand a position of a structure in the subject in a thickness direction.

Therefore, in order to enable three-dimensional imaging of the subject, for example, JP2013-173015 A proposes an X-ray imaging apparatus in which a multi-X-ray generation apparatus including M×N X-ray sources and a planar detector including K×L sensors are made to face each other with an arm. This X-ray imaging apparatus can acquire any multi-layer tomographic image by periodically performing irradiation with X-rays from the plurality of X-ray sources while rotating the arm about a slide rotation axis and a main axis, and synchronously operating the sensors, imaging a plurality of multidirectional images, and performing reconstruction based on coordinate information of the X-ray sources.

In addition, JP2021-133036A discloses a so-called biplane X-ray imaging apparatus. This X-ray imaging apparatus has a configuration in which a first X-ray tube and a first X-ray detector are disposed to face each other by a first C-type arm, and a second X-ray tube and a second X-ray detector are disposed to face each other by a second C-type arm. Rotation axes of the first C-type arm and the second C-type arm are set to intersect with each other. A three-dimensional image can be obtained by rotating each of the first C-type arm and the second C-type arm to perform imaging.

SUMMARY OF THE INVENTION

The biplane X-ray imaging apparatus in the related art as in JP2021-133036A is large and expensive. On the other hand, in a multi-tube system using the M×N X-ray sources as in JP2013-173015A, it is necessary to prepare a large number of X-ray sources, the configuration is complicated, and the apparatus is large.

An object of the present invention is to provide an X-ray imaging apparatus that can understand a three-dimensional position of a treatment tool in real time with a minimum necessary and a compact configuration.

In order to achieve the above object, an aspect of the present invention provides an X-ray imaging apparatus including a top plate on which a subject is placed, a first X-ray tube that irradiates the subject with X-rays, a first column that supports the first X-ray tube, a second X-ray tube that irradiates the subject with X-rays, a second column that supports the second X-ray tube, an X-ray detector that detects the X-rays that are applied from the first X-ray tube and the second X-ray tube and are transmitted through the subject, and an operation unit. The second X-ray tube is disposed at a position shifted from an optical axis of the first X-ray tube by the second column. At least one of the second column or the first column comprises a drive mechanism that changes a relative position of the second X-ray tube with respect to the first X-ray tube and/or a relative position of the second X-ray tube with respect to the X-ray detector. The operation unit acquires a first X-ray image from output of the X-ray detector that has detected the X-rays applied from the first X-ray tube, acquires a second X-ray image from output of the X-ray detector that has detected the X-rays applied from the second X-ray tube, and uses a position of an image of a predetermined feature part included in the first X-ray image and a position of an image of the feature part included in the second X-ray image to calculate a three-dimensional position of the image of the predetermined feature part.

According to the aspect of the present invention, it is possible to provide the X-ray imaging apparatus that can understand the three-dimensional position of the treatment tool in real time during a medical operation without rotating the column of the X-ray tube.

BRIEF DESCRIPTION OF THE DRAWINGS (a) of FIG. 1 is a block diagram showing disposition and a movement direction of two X-ray tubes in a case in which an X-ray imaging apparatus 1 according to Embodiment 1 of the present invention is viewed from a side surface, and (b) of FIG. 1 is a block diagram showing disposition and a movement direction of the two X-ray tubes in a case in which the X-ray imaging apparatus 1 is viewed from a front surface.

(a) of FIG. 6 is an explanatory diagram showing three-dimensional positions S1 and S2 of the first X-ray tube 60 and the second X-ray tube 110 of the X-ray imaging apparatus 1 according to Embodiment 1 and three-dimensional positions D1 and D2 of a feature part of a treatment tool projected onto the X-ray detector 70, (b) of FIG. 6 is a diagram showing an example of a first X-ray image, (c) of FIG. 6 is a diagram showing an example of a second X-ray image, and (d) of FIG. 6 is a diagram showing a calculation method of the three-dimensional position of the feature part of the treatment tool.

(a) of FIG. 10 is an explanatory diagram showing calculation of a two-dimensional projection image by projecting a pre-captured three-dimensional image acquired by the X-ray imaging apparatus 2 according to Embodiment 2, (b) of FIG. 10 is a diagram showing an example of a first two-dimensional projection image and a first X-ray image, and (c) of FIG. 10 is a diagram showing an example of a second two-dimensional projection image and a second X-ray image.

DESCRIPTION OF THE PREFERRED EMBODIMENTS

Hereinafter, embodiments of the present invention will be described with reference to the accompanying drawings.

Embodiment 1

A configuration of an X-ray imaging apparatus 1 according to the embodiment will be described.

Figure 1:
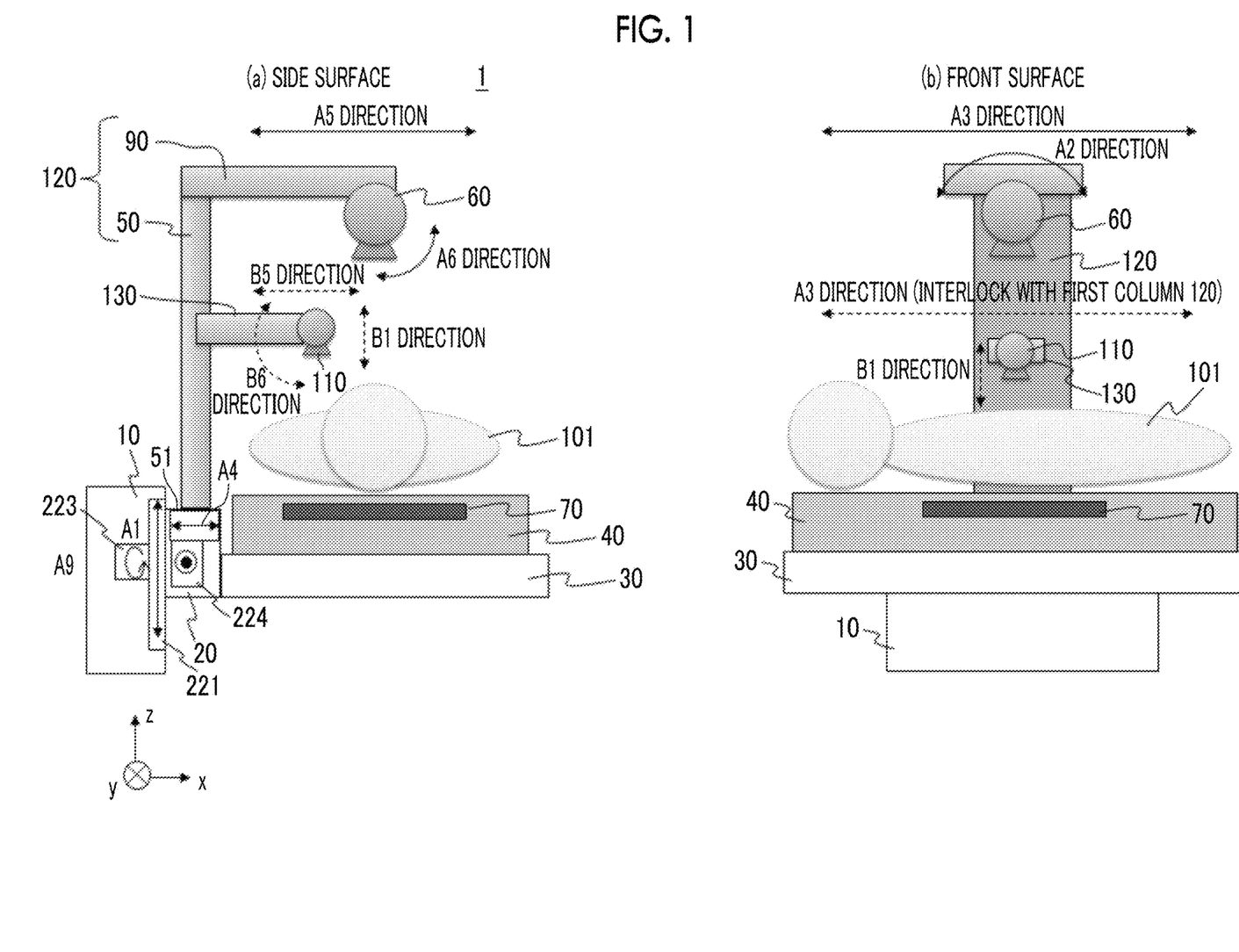
Figure 2:
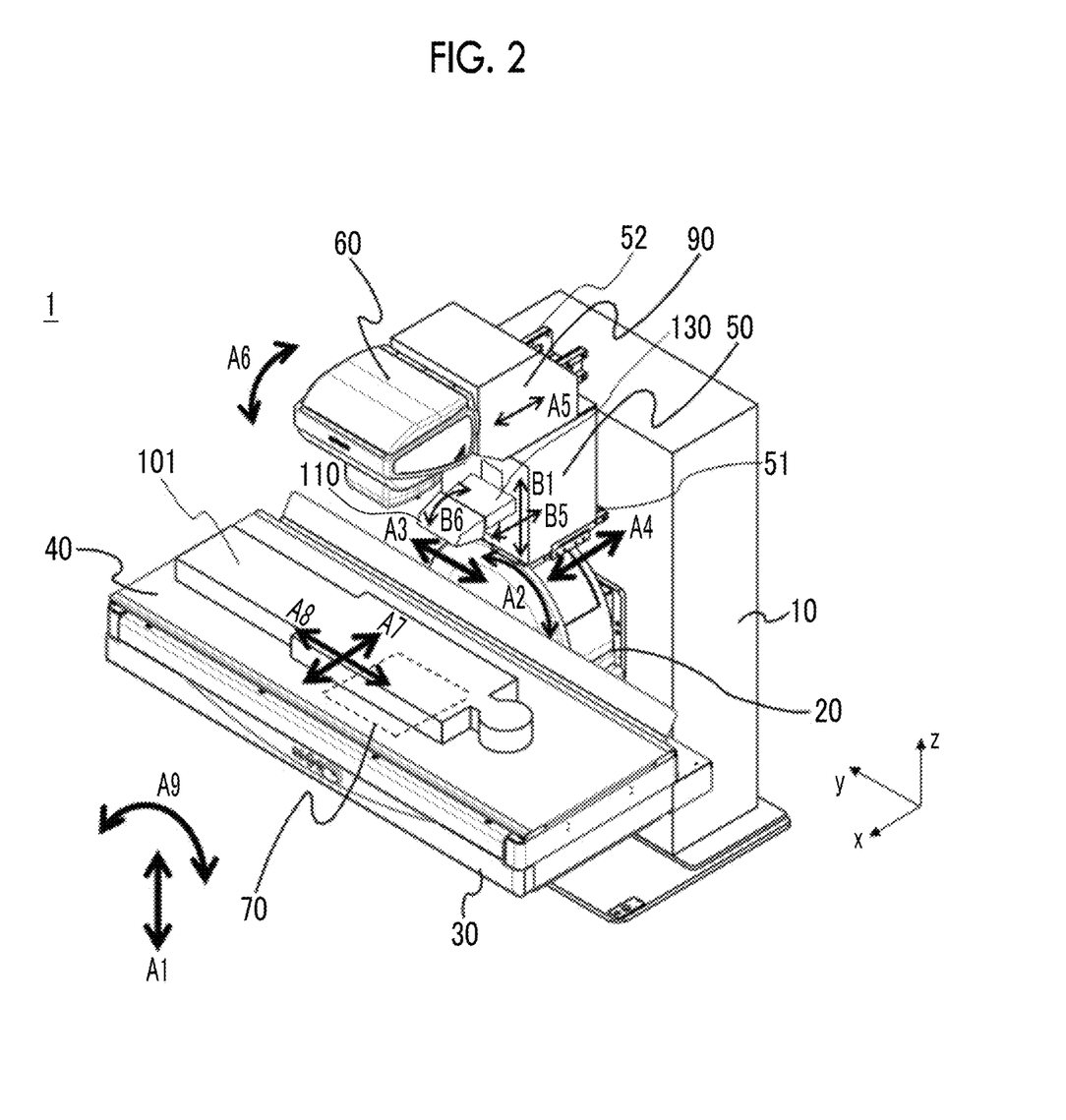
FIG. 2 is a perspective view of the X-ray imaging apparatus 1 according to Embodiment 1.
Figure 3:
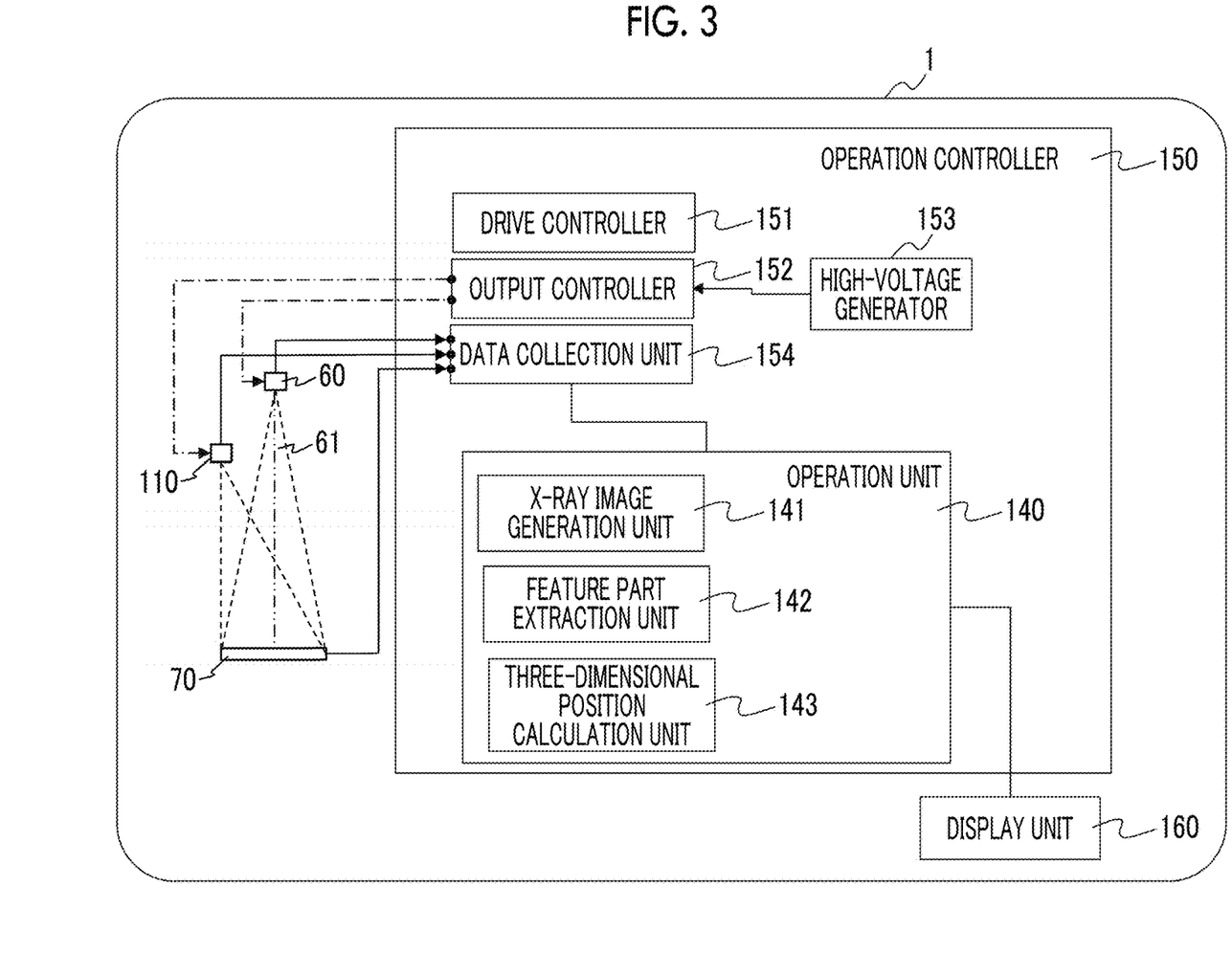
FIG. 3 is a block diagram showing a configuration of main units of the X-ray imaging apparatus 1 according to Embodiment 1.
Figure 4:
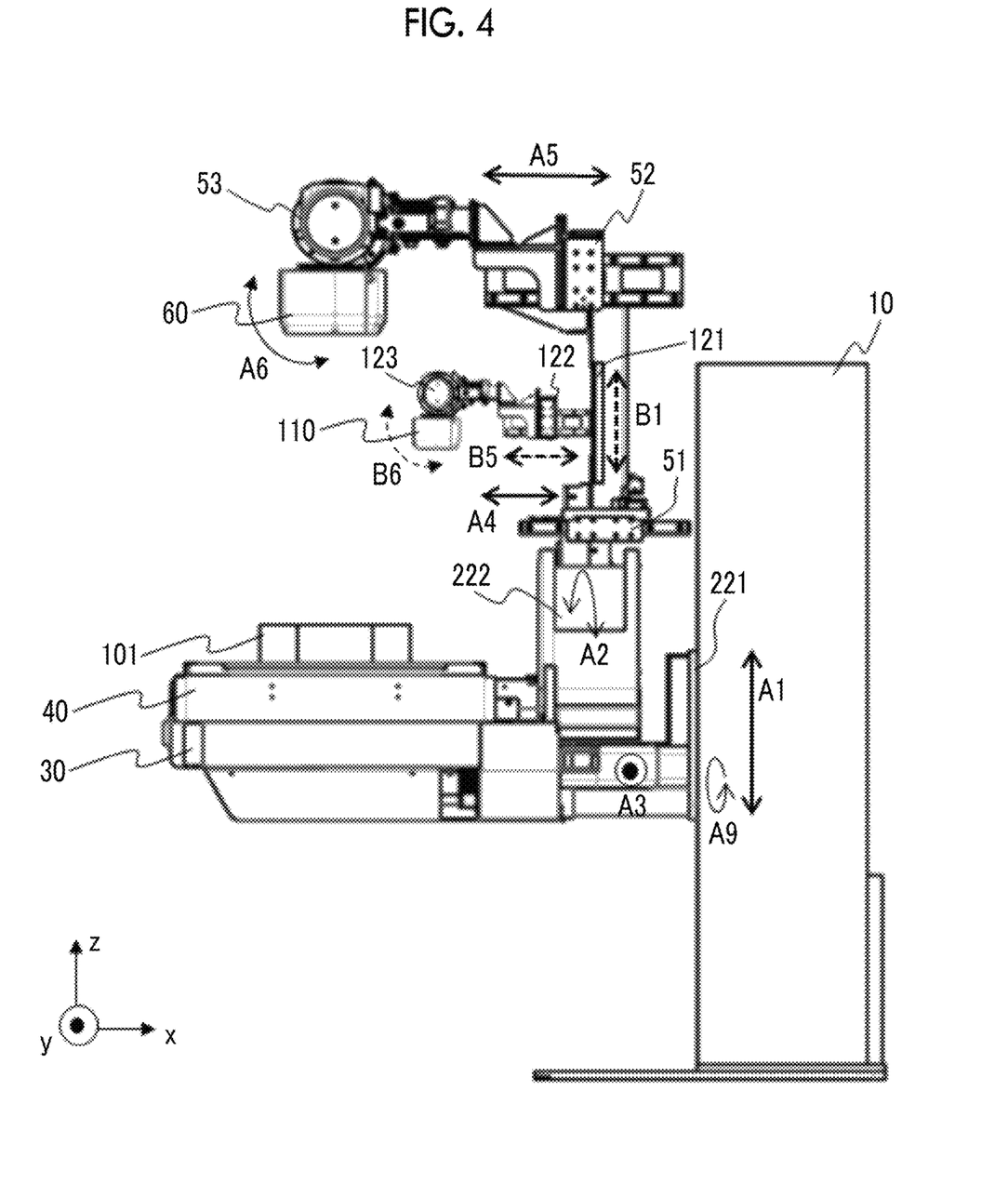
FIG. 4 is a side view of the X-ray imaging apparatus 1 according to Embodiment 1 in which a part of a housing is removed.
Figure 6:
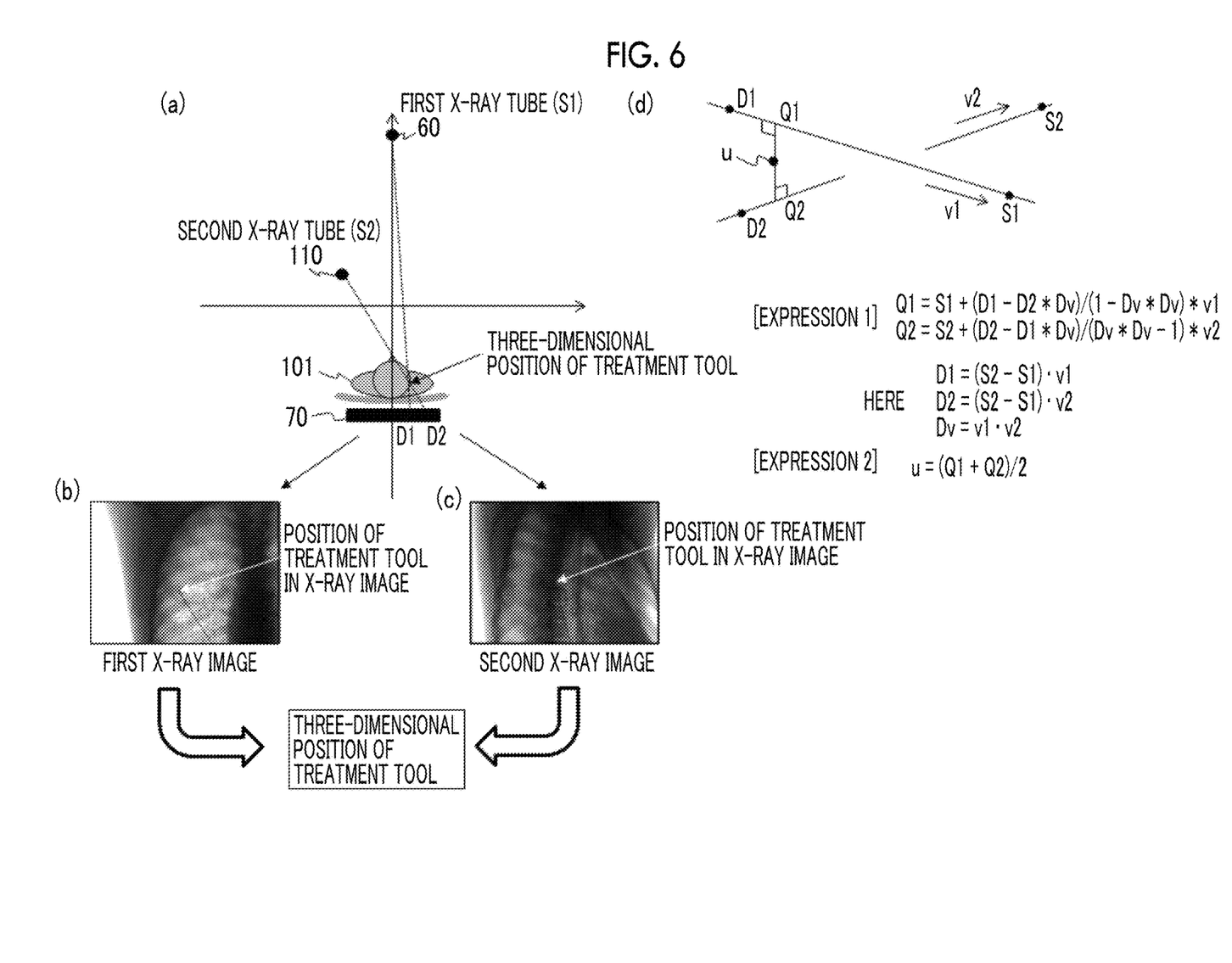

(a) and (b) of FIG. 1 are diagrams showing disposition and a movement direction of two X-ray tubes in a case in which the X-ray imaging apparatus 1 is viewed from a side surface and a front surface, respectively. FIG. 2 is a perspective view of the X-ray imaging apparatus 1. FIG. 3 is a block diagram showing a configuration of main units of the X-ray imaging apparatus 1. FIG. 4 is a side view of the X-ray imaging apparatus 1 in which a part of a housing is removed. FIG. 6 is a diagram showing a timing of irradiation with X-rays.

As shown in FIGS. 1 to 4, the X-ray imaging apparatus 1 comprises a first X-ray tube 60 and a second X-ray tube 110 that irradiate a subject 101 with X-rays, a top plate 40 on which the subject 101 is placed, an X-ray detector 70, a stand 10, and an operation controller 150. The X-ray detector 70 is disposed in the top plate 40, and detects the X-rays that are applied from the first X-ray tube 60 and the second X-ray tube 110 and are transmitted through the subject 101.

The first X-ray tube is supported by a first column 120 with respect to the stand 10. The first column 120 includes a column 50 and a first X-ray support arm 90.

The second X-ray tube 110 is supported by a second column 130 with respect to the stand 10. A position at which the second X-ray tube 110 is supported by the second column 130 is a position that is shifted from an optical axis 61 of the first X-ray tube 60 and is closer to the subject 101 than the first X-ray tube 60. The position shifted from the optical axis 61 of the first X-ray tube 60 means that the second X-ray tube 110 is located outside an irradiation region of the first X-ray tube 60, and also includes a case in which incidence angles of an optical axis of the second X-ray tube 110 and the optical axis 61 of the first X-ray tube 60 with respect to the subject 101 are different from each other.

In addition, a maximum irradiation region of the X-rays from the second X-ray tube 110 to the X-ray detector 70 may be smaller than a maximum irradiation region of the X-rays from the first X-ray tube 60 to the X-ray detector 70.

Maximum output of the X-rays of the second X-ray tube 110 may be smaller than maximum output of the X-rays of the first X-ray tube 60.

In the present embodiment, the second column 130 has a shape of a support arm supported by the first column 120. The second column 130 has a configuration in which the second column 130 is supported with respect to the stand 10 via the first column 120. However, the present embodiment is not limited to this configuration, and a configuration may be adopted in which the second column 130 is directly installed upright on the stand 10.

At least one of the second column 130 or the first column 120 comprises a drive mechanism that changes a relative position of the second X-ray tube 110 with respect to the first X-ray tube 60.

In the present embodiment, as an example, a connecting portion between the first column 120 and the second column 130 comprises an up-down moving mechanism 121 that moves a position of the second column 130 that supports the second X-ray tube 110 in an up-down direction (B1 direction=z direction) with respect to the first column 120. In addition, the second column 130 comprises a third slide mechanism 122 that moves the position of the second X-ray tube 110 in a width direction (B5 direction=x direction) of the top plate 40 with respect to the second column 130. Further, a second rotation mechanism 123 that causes the second X-ray tube 110 to move rotationally (in B6 direction) about an axis parallel to a major axis (y axis) of the top plate 40 at a distal end of the second column 130 is disposed at a connecting portion between the second X-ray tube 110 and the second column 130.

In addition, the first X-ray support arm 90 of the first column 120 that supports the first X-ray tube 60 comprises a second slide mechanism 52 that moves a position of the first X-ray tube 60 in the width direction (A5 direction=x direction) of the top plate 40 with respect to the first column 120. Further, a first rotation mechanism 53 that causes the first X-ray tube 60 to move rotationally (in A6 direction) about an axis parallel to the major axis (y axis) of the top plate 40 at a distal end of the first X-ray support arm 90 is disposed at a connecting portion between the first X-ray tube 60 and the first X-ray support arm 90.

With these drive mechanisms, the relative position of the second X-ray tube 110 with respect to the first X-ray tube 60 can be changed in the up-down direction (z direction) and the width direction (x direction) of the top plate 40. In addition, the relative direction of the second X-ray tube 110 with respect to the first X-ray tube 60 can be changed by rotational movement about the axis parallel to the major axis (y axis) of the top plate 40.

In addition, in the present embodiment, the first column 120 is mounted on the column support arm 20 provided on the stand 10. A first slide mechanism 51 that moves a lower end of the column 50 in the width direction (f direction=x direction) of the top plate 40 with respect to the stand 10 is provided between the lower end of the column 50 of the first column 120 and the column support arm 20. As a result, the first column 120 and the second column 130 can be integrally moved in the x direction.

A support frame 30 that supports the top plate 40 is mounted on the column support arm 20 in addition to the first column 120. The stand 10 has a built-in drive mechanism that moves the column support arm 20 up and down (A1 direction=z axis). As a result, the top plate 40 and the first X-ray tube 60 can be moved up and down while maintaining the positional relationship between the first X-ray tube 60 and the top plate 40.

In addition, the column support arm 20 of the stand 10 has a built-in moving mechanism 224 that moves the first column 120 in the major axis direction (A3 direction=y axis) of the top plate 40. As a result, the first X-ray tube 60 and the second X-ray tube 110 can be moved with respect to the top plate 40 in the major axis direction (y axis) of the top plate 40.

In addition, the stand 10 comprises a raising and lowering mechanism 223 that rotates the column support arm 20 (in A9 direction) with the central axis (x axis) of the column support arm 20 as a rotation center. As a result, the top plate 40 can be moved up and down while maintaining the positional relationship between the first X-ray tube 60 and the top plate 40.

Further, a connecting portion between the column support arm 20 and the first column 120 comprises an inclination mechanism 222 that causes the first column 120 to move rotationally (in A2 direction) with the central axis (x axis) of the column support arm 20 as a rotation center with respect to the column support arm 20 along a semi-circular rail. As a result, the first column 120 can be inclined with respect to the top plate 40 with the x axis as a rotation center.

Further, although not shown, a drive mechanism (not shown) that moves the X-ray detector 70 in the major axis direction (A8 direction) and a minor axis direction (A7 direction) of the top plate 40 with respect to the top plate 40 is provided in the top plate 40.

Each of the drive mechanisms 51 to 53, 121 to 123, and 221 to 224 may have any configuration. As an example, a configuration can be adopted in which a rack disposed along the movement direction, a pinion that meshes with the rack, and a motor that rotates the pinion are provided.

The operation controller 150 comprises a drive controller 151 that controls the operation of each of the drive mechanisms 51 to 53, 121 to 123, and 221 to 224, an output controller 152, a high-voltage generator 153, a data collection unit 154, and an operation unit 140.

The output controller 152 supplies a high-voltage generated by the high-voltage generator 153 to the first X-ray tube 60 and the second X-ray tube 110 with the set voltage values and current values at timings as shown in FIG. 6, respectively, and applies the X-rays from the first X-ray tube 60 and the second X-ray tube 110. The output controller 152 can individually control the output of the first X-ray tube 60 and the output of the second X-ray tube 110.

The data collection unit 154 collects signals output by X-ray detection elements two-dimensionally arranged in the X-ray detector 70 in response to the irradiation with the X-rays at the timings shown in FIG. 6. In addition, the data collection unit 154 acquires information on the start and end of the irradiation from each X-ray tube from the tube current and the tube voltage that are controlled by the output controller 152.

The operation unit 140 comprises an X-ray image generation unit 141, a feature part extraction unit 142, and a three-dimensional position calculation unit 143.

The X-ray image generation unit 141 receives the output of the X-ray detector 70 that has detected the X-rays applied from the first X-ray tube, from the data collection unit 154, to generate a first X-ray image (see (b) of FIG. 6). In addition, the X-ray image generation unit 141 receives the output of the X-ray detector 70 that has detected the X-rays applied from the second X-ray tube, from the data collection unit 154, to generate a second X-ray image (see (c) of FIG. 6).

The feature part extraction unit 142 extracts a position of an image of a predetermined feature part included in the first X-ray image and a position of an image of the feature part included in the second X-ray image by a known method. The feature part is, for example, a distal end of a treatment tool, such as a catheter.

The three-dimensional position calculation unit 143 uses the position of the image of the predetermined feature part included in the first X-ray image and the position of the image of the feature part included in the second X-ray image calculate a three-dimensional position of the image of the predetermined feature part.

An example of a specific calculation method of the feature part will be described. As shown in (a) of FIG. 6, a three-dimensional position (real space coordinates) of the first X-ray tube 60 is denoted by S1, a three-dimensional position (real space coordinates) of the feature part in the first X-ray image is denoted by D1, and a straight line connecting S1 and D1 is denoted by L1. In addition, a three-dimensional position of the second X-ray tube 110 is denoted by S2, a three-dimensional position of the feature part in the second X-ray image is denoted by D2, and a straight line connecting S2 and D2 is denoted by L2. The same feature part such as the distal end of the treatment tool are projected onto D1 and D2. Therefore, the straight lines L1 and L2 ideally intersect with each other at one point as shown in (a) of FIG. 6. Actually, as shown in (d) of FIG. 6, there are cases where the straight lines L1 and L2 do not intersect with each other due to a measurement error or the like. Therefore, a point Q1 on the straight line S1-D1 and a point Q2 on the straight line S2-D2 where the distance between the two straight lines is closest are obtained, and for example, a midpoint u of the two points can be set as the position of the image of the feature part.

The points Q1 and Q2 shown in (c) of FIG. 6 can be obtained according to Expression 1.

$$Q1 = S1 + (D1 - D2 * Dv)/(1 - Dv * Dv) * v1 \quad (1)$$
$$Q2 = S2 + (D2 - D1 * Dv)/(Dv * Dv - 1) * v2$$

Here, $$D1 = (S2 - S1) v1$$
$$D2 = (S2 - S1) v2$$
$$Dv = v1 \cdot v2$$

From the three-dimensional positions of the points Q1 and Q2 obtained by Expression 1, the three-dimensional position u of the feature part can be calculated by using Expression 2.

$$u = (Q1 + Q2)/2 \quad (2)$$

Figure 7:
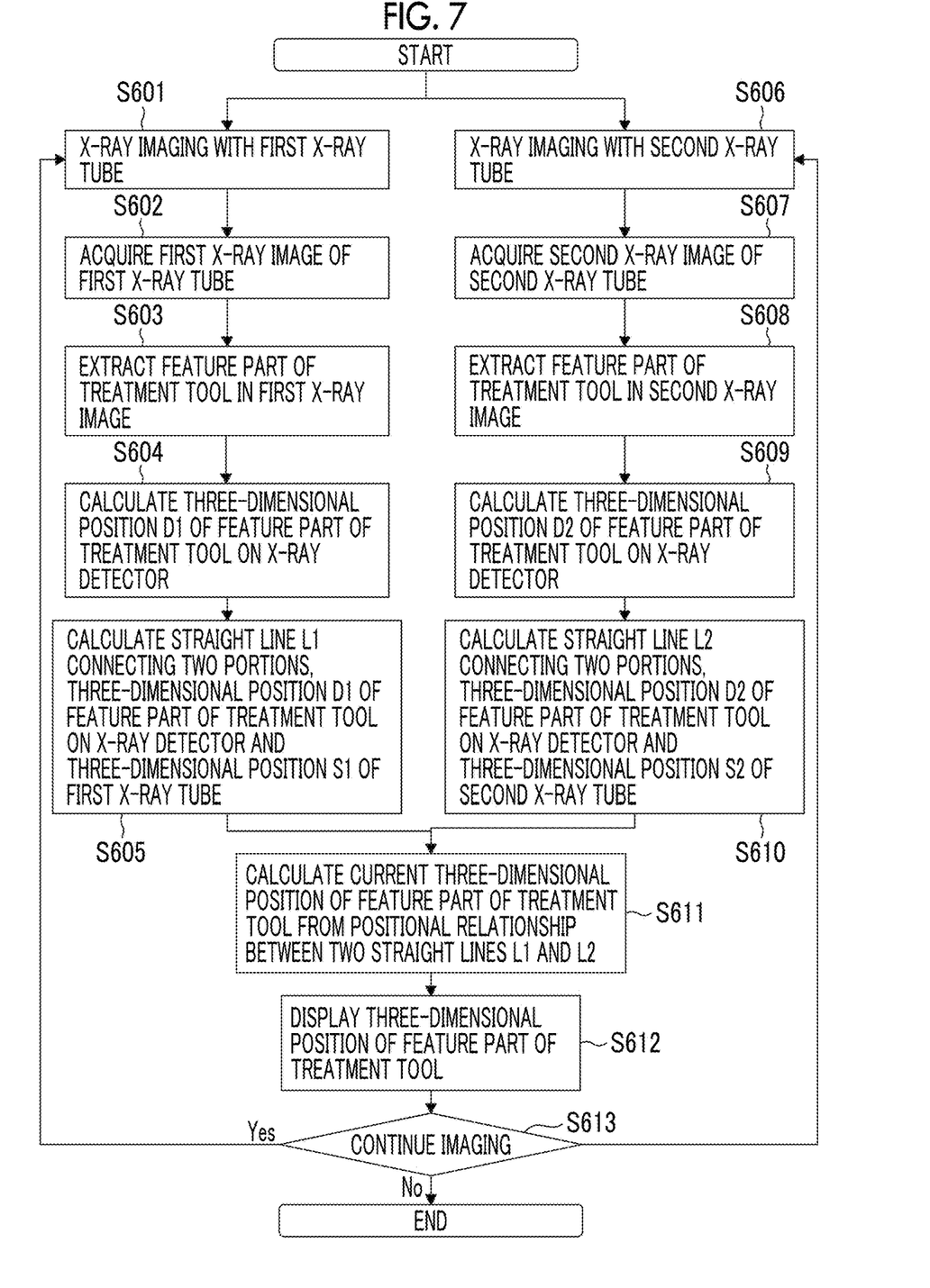
FIG. 7 is a flowchart showing an operation of the X-ray imaging apparatus 1 according to Embodiment 1.

Next, an operation of each unit in a case in which the three-dimensional position of the distal end of the treatment tool is detected during a medical operation under an X-ray fluoroscopic image by the X-ray imaging apparatus 1 according to the present embodiment will be described with reference to FIG. 7. FIG. 7 is a flow showing the operation of each unit.

The subject 101 is placed on the top plate 40 in advance, and a user operates each of the drive mechanisms 51 to 53 under the control of the drive controller 151, to dispose the first X-ray tube 60 at a position on the subject 101 at which a target part into which the device is inserted can be imaged. In addition, based on the prior information of the target part and/or the device to be used, the user operates each of the drive mechanisms 121 to 123 under the control of the drive controller 151, to dispose the second X-ray tube 110 at a position desired by an operator.

Step S601

Figure 5:
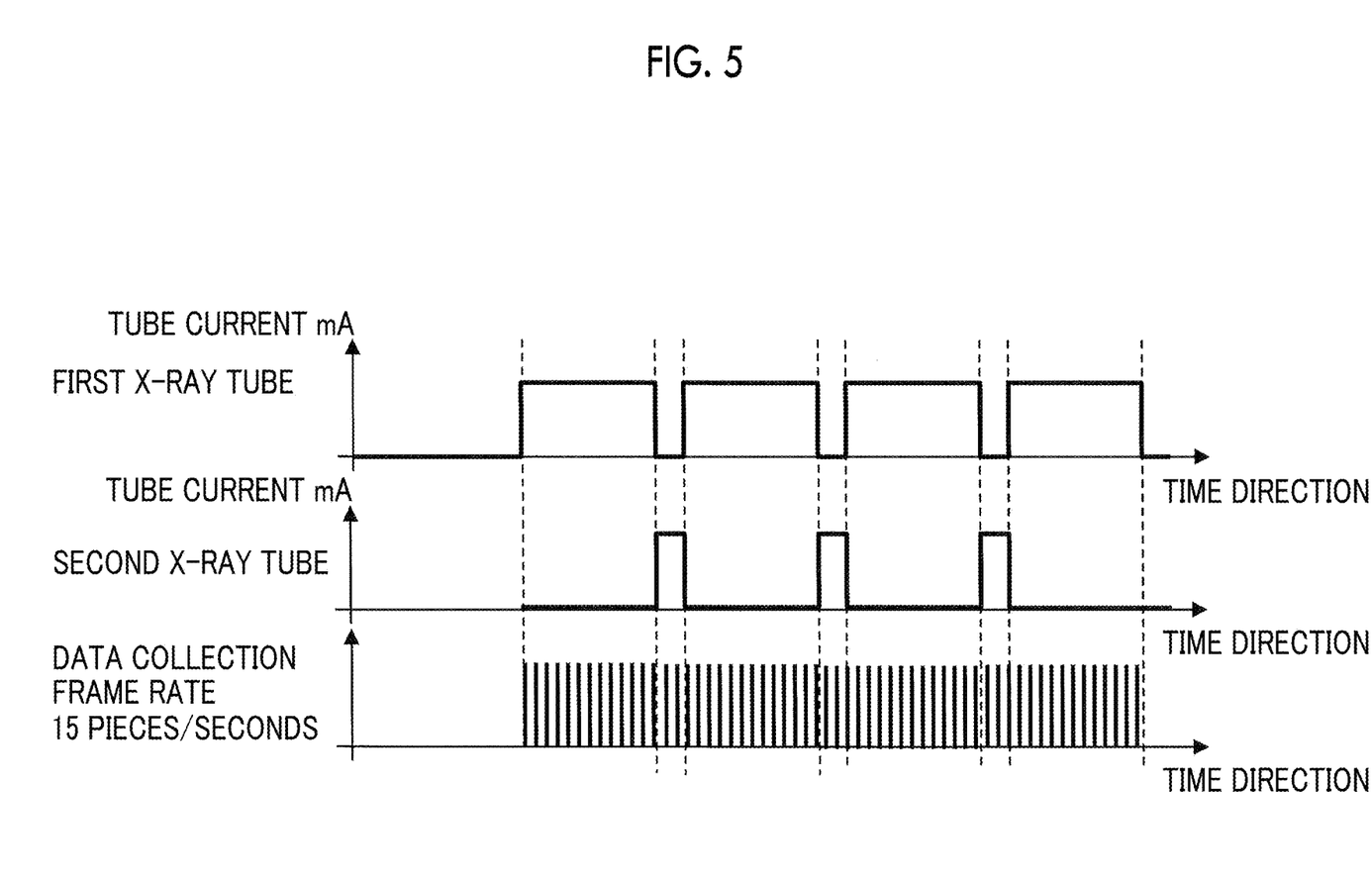
FIG. 5 is a timing chart showing a timing of supplying a tube current to a first X-ray tube 60 and a second X-ray tube 110 of the X-ray imaging apparatus 1 according to Embodiment 1 and a timing of data collection from an X-ray detector.

In a case in which the operator gives an instruction to start the operation, as shown in FIG. 5, the tube current is supplied to the first X-ray tube 60 and the subject 101 is irradiated with the X-rays from the first X-ray tube 60, to start X-ray imaging.

Specifically, the drive controller 151 controls the operation of each of the drive mechanisms 51 to 53, 121 to 123, and 221 to 224 in accordance with the instruction of the operator, to dispose the first X-ray tube 60 at the position desired by the operator. The output controller 152 supplies the tube current and the tube voltage, which are set by the operator, to the first X-ray tube 60, and starts the irradiation with the X-rays.

Step S602

The X-ray image generation unit 141 acquires an X-ray image from the X-rays applied from the first X-ray tube 60.

Specifically, the X-rays that are applied from the first X-ray tube 60 and are transmitted through the subject 101 are detected by the X-ray detector 70, and the output of the X-ray detector 70 is collected by the data collection unit 154.

The X-ray image generation unit 141 receives the output of the X-ray detector 70 from the data collection unit 154, to generate the first X-ray image (see (b) of FIG. 6). The X-ray image generation unit 141 displays the first X-ray image on a display unit 160.

The operator inserts the treatment tool (catheter or the like) into the subject while viewing the first X-ray image on the display unit 160.

Step S603

The feature part extraction unit 142 performs image processing on the first X-ray image generated in step S602 to extract the feature part (for example, the distal end of the treatment tool) of the treatment tool in the first X-ray image.

Step S604

The three-dimensional position calculation unit 143 calculates the three-dimensional position D1 (real space coordinates) on the X-ray detector 70 onto which the feature part of the treatment tool is projected, based on the position of the treatment tool in the first X-ray image.

Step S605

The three-dimensional position calculation unit 143 calculates the straight line L1 connecting the two points, the three-dimensional position D1 (real space coordinates) of the feature part of the treatment tool on the X-ray detector and the three-dimensional position S1 (real space coordinates) of the first X-ray tube 60.

Step S606

As shown in FIG. 5, at a timing at which the irradiation with the X-rays from the first X-ray tube 60 ends, the subject 101 is irradiated with the X-rays from the second X-ray tube 110 to perform the X-ray imaging.

Specifically, the output controller 152 stops the supply of the tube current and the tube voltage to the first X-ray tube 60, supplies the tube current and the tube voltage, which are set by the operator, to the second X-ray tube 110, and performs the irradiation with the X-rays only for a predetermined time.

Step S607

The X-ray image generation unit 141 acquires an X-ray image from the X-rays applied from the second X-ray tube 110.

Specifically, the X-rays that are applied from the second X-ray tube 110 and are transmitted through the subject 101 are detected by the X-ray detector 70, and the output of the X-ray detector 70 is collected by the data collection unit 154 at a predetermined timing shown in FIG. 5.

The X-ray image generation unit 141 receives the output of the X-ray detector 70 from the data collection unit 154, to generate the second X-ray image (see (c) of FIG. 6).

As a result, the operator can check the second X-ray image captured from an angle different from an angle of the first X-ray image on the display unit 160.

Step S608

The feature part extraction unit 142 performs image processing on the second X-ray image generated in step S607 to extract the feature part (the distal end of the treatment tool) of the treatment tool in the second X-ray image.

Step S609

The three-dimensional position calculation unit 143 calculates the three-dimensional position D2 (real space coordinates) on the X-ray detector 70 onto which the feature part of the treatment tool is projected, based on the position of the treatment tool in the second X-ray image.

Step S610

The three-dimensional position calculation unit 143 calculates the straight line L2 connecting the two points, the three-dimensional position D2 (real space coordinates) of the feature part of the treatment tool on the X-ray detector and the three-dimensional position S2 (real space coordinates) of the second X-ray tube 110.

Step S611

The three-dimensional position calculation unit 143 calculates the three-dimensional position of the feature part of the treatment tool from a positional relationship between the two straight lines L1 and L2 by using Expressions 1 and 2.

Step S612

Figure 8:
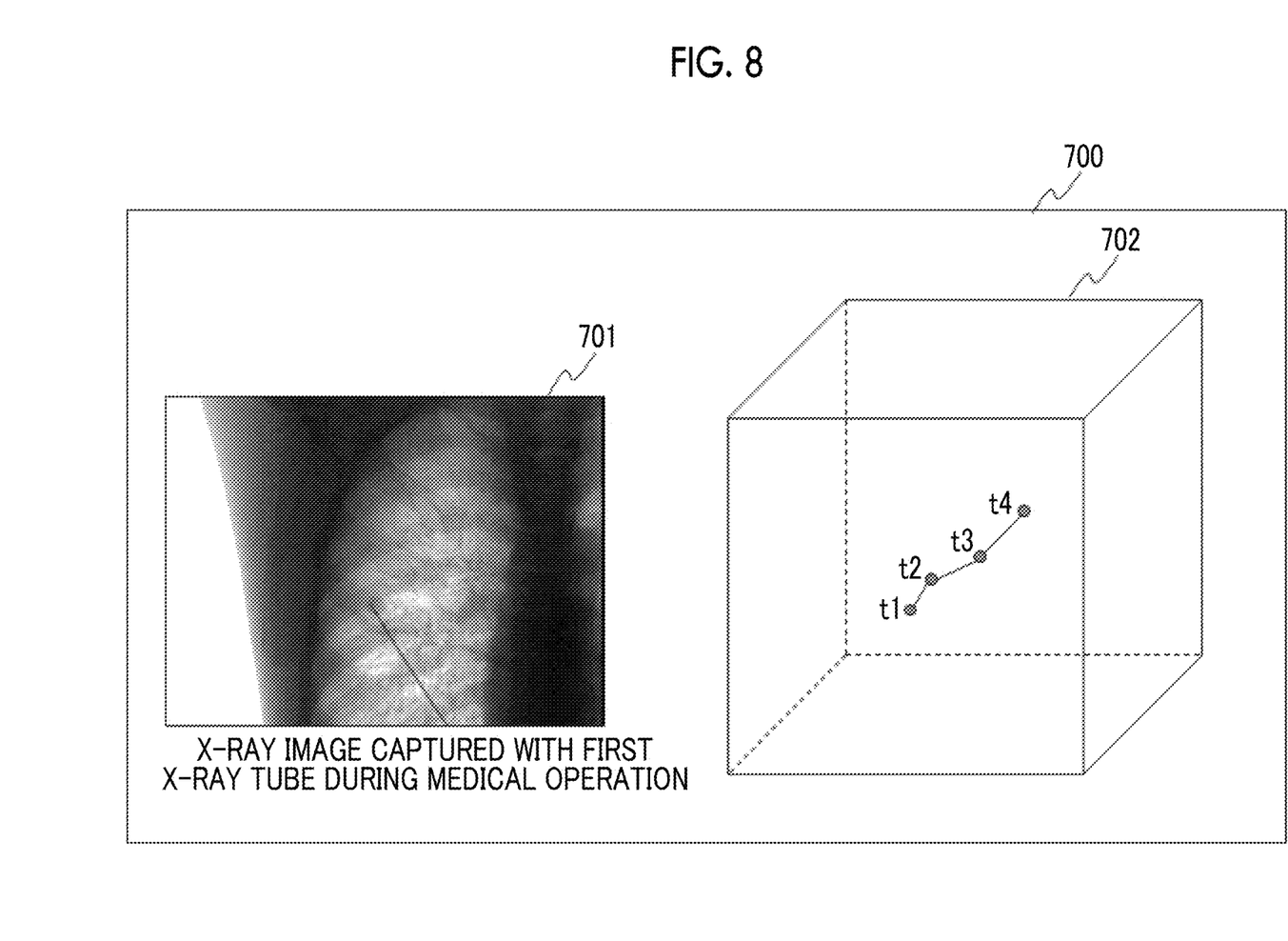
FIG. 8 is a diagram showing an example of a screen displayed on a display unit of the X-ray imaging apparatus 1 according to Embodiment 1.

The three-dimensional position calculation unit 143 displays the calculated current three-dimensional position of the feature part of the treatment tool, for example, as in a three-dimensional image 702 of FIG. 8. As a result, on a display screen of the display unit 160, a first X-ray image 701 and the three-dimensional image 702 showing the positions of the feature part of the treatment tool in time series are displayed side by side. The operator can understand a projection image of the subject 101 and the treatment tool from the first X-ray image 701, and can understand a temporal change of a depth of the distal end of the treatment tool from the three-dimensional image 702.

Step S612

An instruction to continue the imaging from the operator is checked, and in a case in which the imaging is to be continued, the process returns to step S601, the imaging with the first X-ray tube 60 is continued, the imaging with the second X-ray tube 110 of steps S606 to S610 is performed at regular time intervals, the position of the feature part of the treatment tool is calculated, and the display is updated. As a result, the positions of the feature part of the treatment tool are acquired in time series at regular time intervals.

As described above, according to the present embodiment, since the imaging can be performed by the second X-ray tube 110 while the imaging is performed by the first X-ray tube 60 during the medical operation, the three-dimensional position of the feature part of the treatment tool can be understood in real time. In this case, since it is not necessary to rotate the X-ray tube and the X-ray detector, the operator does not need to move back, and the operator does not need to stop performing the procedure, such as inserting the treatment tool.

Since the position of the second X-ray tube 110 with respect to the subject 101 and the irradiation direction with respect to the subject 101 can be adjusted by the drive mechanisms 122 and 123, the X-rays can be applied to the feature part of the treatment tool even in a case in which the irradiation range is narrowed, and the detection accuracy of the position of the feature part of the treatment tool is improved.

In addition, since the distance between the second X-ray tube 110 and the X-ray detector 70 can be adjusted by the up-down moving mechanism 121, the second X-ray tube 110 can be brought closer to the subject 101, and a small X-ray tube having small output and a narrow irradiation range can be used as the second X-ray tube 110. As a result, the second X-ray tube 110 does not interfere with the imaging with the first X-ray tube 60, and the first X-ray tube 60 and the second X-ray tube 110 can perform the imaging in parallel in real time.

In a case in which the positions of the images of the feature part acquired in time series in step S611 are moved, in a case in which step S606 is subsequently executed, it is desirable that the drive controller 151 operates at least one of the drive mechanism 121, 122, or 124 to change at least one of the position, the distance, or the X-ray irradiation direction of the second X-ray tube 110 with respect to the subject 101, and causes the irradiation region of the X-rays from the second X-ray tube 110 to the subject 101 to track the movement of the positions of the feature part. By performing the tracking in this manner, even in a case in which the irradiation region of the X-rays from the second X-ray tube 110 is small, it is possible to always include the moving feature part in the irradiation region.

Embodiment 2

An X-ray imaging apparatus 2 according to Embodiment 2 has a function of generating a two-dimensional projection image in a direction desired by the operator from a three-dimensional image captured in advance by a CT apparatus, an MRI apparatus, or the like, and displaying the position of the feature part of the treatment tool on the generated two-dimensional projection image. Since other configurations are the same as the configurations in Embodiment 1, the description of the same configurations and the same operations as the configurations and operations of Embodiment 1 will be omitted.

Figure 9:
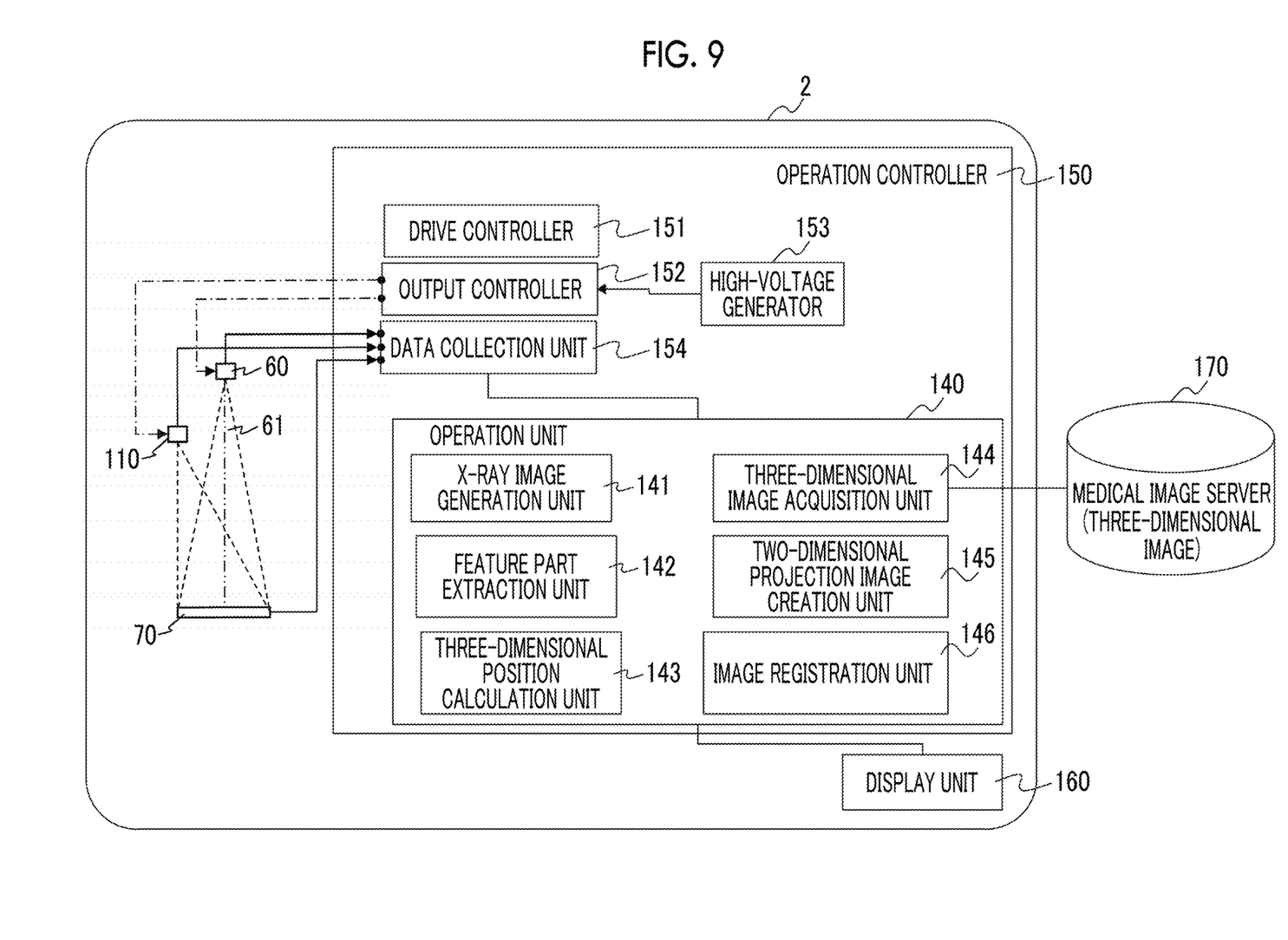
FIG. 9 is a block diagram showing a configuration of main units of an X-ray imaging apparatus 2 according to Embodiment 2.
Figure 10:
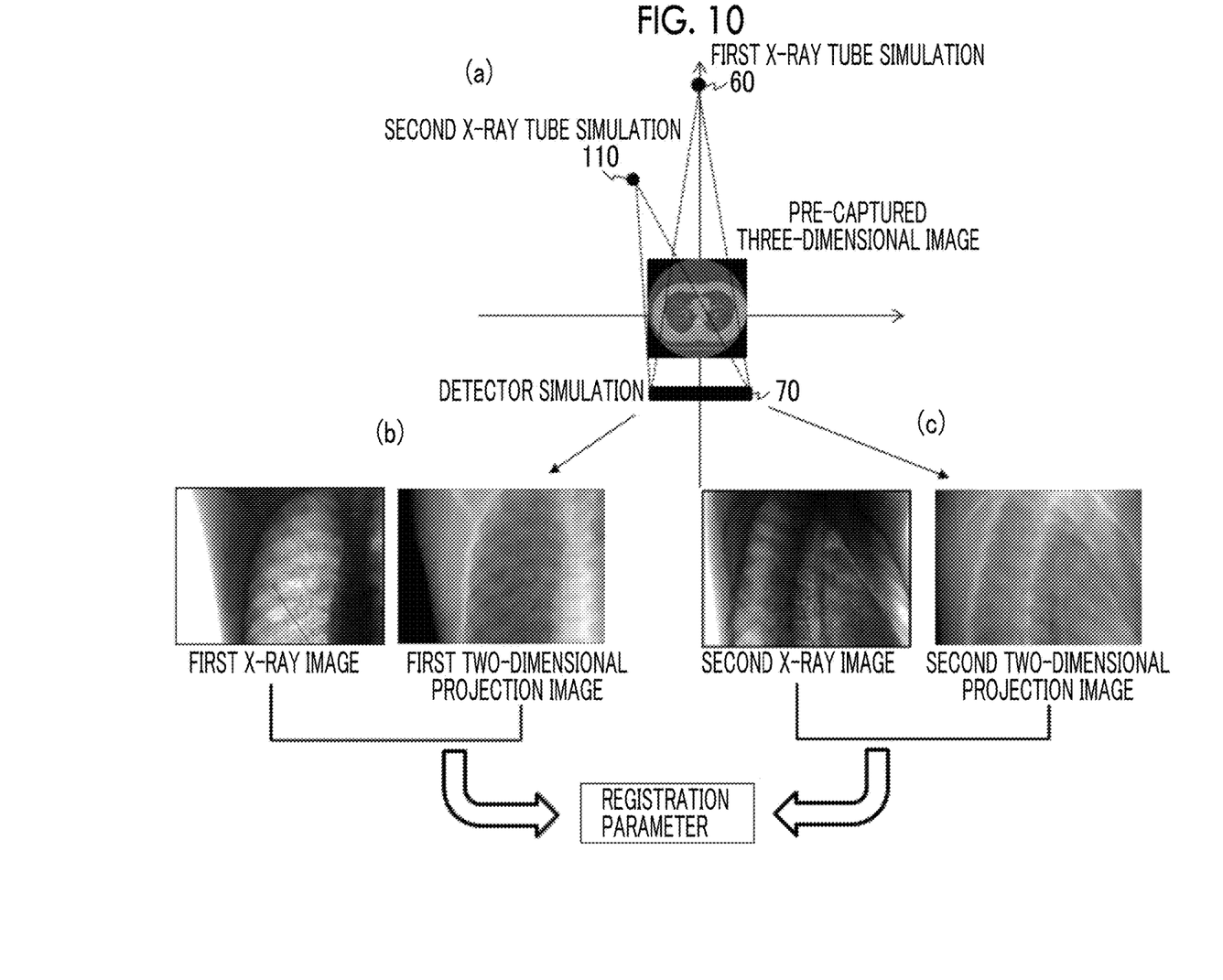

FIG. 9 is a block diagram showing a configuration of main units of the X-ray imaging apparatus 2 according to Embodiment 2. (a) to (c) of FIG. 10 are diagrams showing that a pre-captured three-dimensional image is projected to generate the two-dimensional projection image.

The X-ray imaging apparatus 2 has substantially the same configuration as the X-ray imaging apparatus 1 according to Embodiment 1, but has a difference from Embodiment 1 in that a three-dimensional image acquisition unit 144, a two-dimensional projection image creation unit 145, and an image registration unit 146 are provided in the operation unit 140. The three-dimensional image acquisition unit 144 is connected to an external medical image server 170. The medical image server 170 stores a three-dimensional image of the subject 101 captured in advance by the CT apparatus or the MRI apparatus.

An operation of the X-ray imaging apparatus 2 will be described with reference to the flow of FIG. 11.

Figure 11:
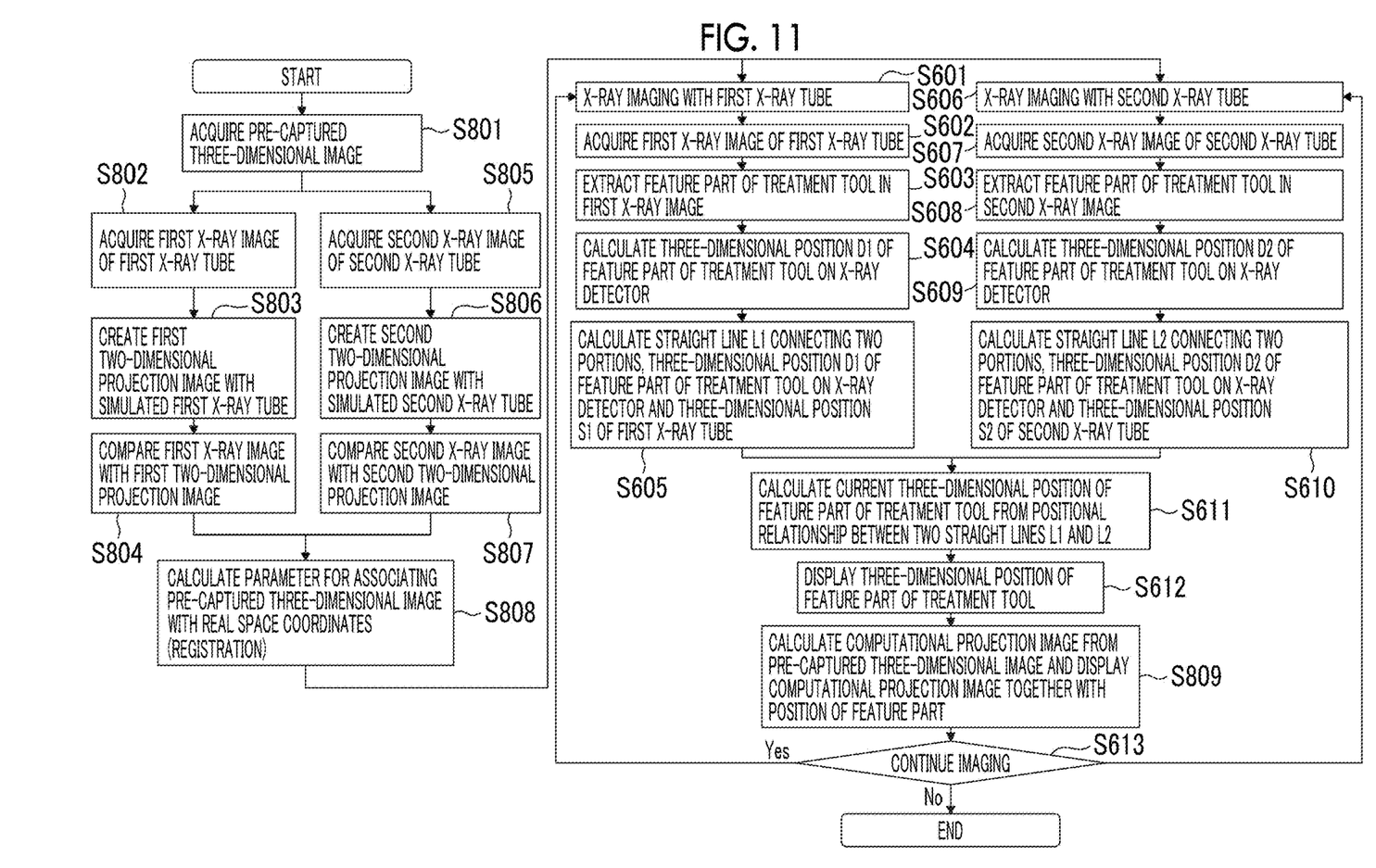
FIG. 11 is a flowchart showing an operation of the X-ray imaging apparatus 2 according to Embodiment 2.

The flow of FIG. 11 is a configuration in which steps S801 to S808, and S809 are added to the flow of FIG. 7 of Embodiment 1.

Step S801

First, the three-dimensional image acquisition unit 144 acquires the three-dimensional image captured in advance for the subject 101 from the medical image server 170.

Step S802

The subject 101 is irradiated with the X-rays from the first X-ray tube 60, and the X-ray image generation unit 141 acquires the first X-ray image.

Step S803

As shown in (a) of FIG. 10, the two-dimensional projection image creation unit 145 disposes a simulated first X-ray tube 60 and a simulated X-ray detector 70 with respect to the pre-captured three-dimensional image at the same position as the positional relationship between the first X-ray tube 60 and the X-ray detector 70 in step S802, projects the pre-captured three-dimensional image onto the simulated X-ray detector 70, and calculate a first two-dimensional projection image.

Step S804

As shown in (b) of FIG. 10, the image registration unit 146 compares the first X-ray image acquired in step S802 with the first two-dimensional projection image calculated in step S803. In a case in which the first X-ray image and the first two-dimensional projection image are different from each other, the position of the pre-captured three-dimensional image with respect to the simulated first X-ray tube 60 and the simulated X-ray detector 70 is changed, the first two-dimensional projection image is calculated again, and the comparison with the first X-ray image acquired in step S802 is performed. The comparison is repeated until the first X-ray image acquired in step S802 and the first two-dimensional projection image calculated in step S803 match.

Step S805

Next, the subject 101 is irradiated with the X-rays from the second X-ray tube 110, and the X-ray image generation unit 141 acquires the second X-ray image.

Step S806

As shown in (a) of FIG. 10, the two-dimensional projection image creation unit 145 disposes a simulated second X-ray tube 110 and the simulated X-ray detector 70 with respect to the pre-captured three-dimensional image at the same position as the positional relationship between the second X-ray tube 110 and the X-ray detector 70 in step S805, projects the pre-captured three-dimensional image onto the simulated X-ray detector 70, and calculate a second two-dimensional projection image.

Step S807

As shown in (c) of FIG. 10, the image registration unit 146 compares the second X-ray image acquired in step S805 with the second two-dimensional projection image calculated in step S806. In a case in which the second X-ray image and the second two-dimensional projection image are different from each other, the position of the pre-captured three-dimensional image with respect to the simulated second X-ray tube 110 and the simulated X-ray detector 70 is changed, the first two-dimensional projection image is calculated again, and the comparison with the second X-ray image acquired in step S805 is performed. The comparison is repeated until the second X-ray image acquired in step S805 and the second two-dimensional projection image calculated in step S806 match.

Step S808

The image registration unit 146 calculates a parameter for associating the coordinate system of the pre-captured three-dimensional image with the real space coordinates from the position of the pre-captured three-dimensional image with respect to the simulated first X-ray tube 60 and the simulated X-ray detector 70 in a case in which the first X-ray image acquired in step S802 and the first two-dimensional projection image calculated in step S803 match (registration). Similarly, the image registration unit 146 calculates a parameter for associating the coordinate system of the pre-captured three-dimensional image with the real space coordinates from the position of the pre-captured three-dimensional image with respect to the simulated second X-ray tube 110 and the simulated X-ray detector 70 in a case in which the second X-ray image acquired in step S805 and the second two-dimensional projection image calculated in step S806 match (registration).

Steps S601 to S612

Steps S601 to S612 are executed in the same manner as in Embodiment 1, the current three-dimensional position of the feature part of the treatment tool is calculated, and the three-dimensional image 702 indicating the calculated position and the first X-ray image 701 are displayed on the display unit 160.

Step S809

Figure 12:
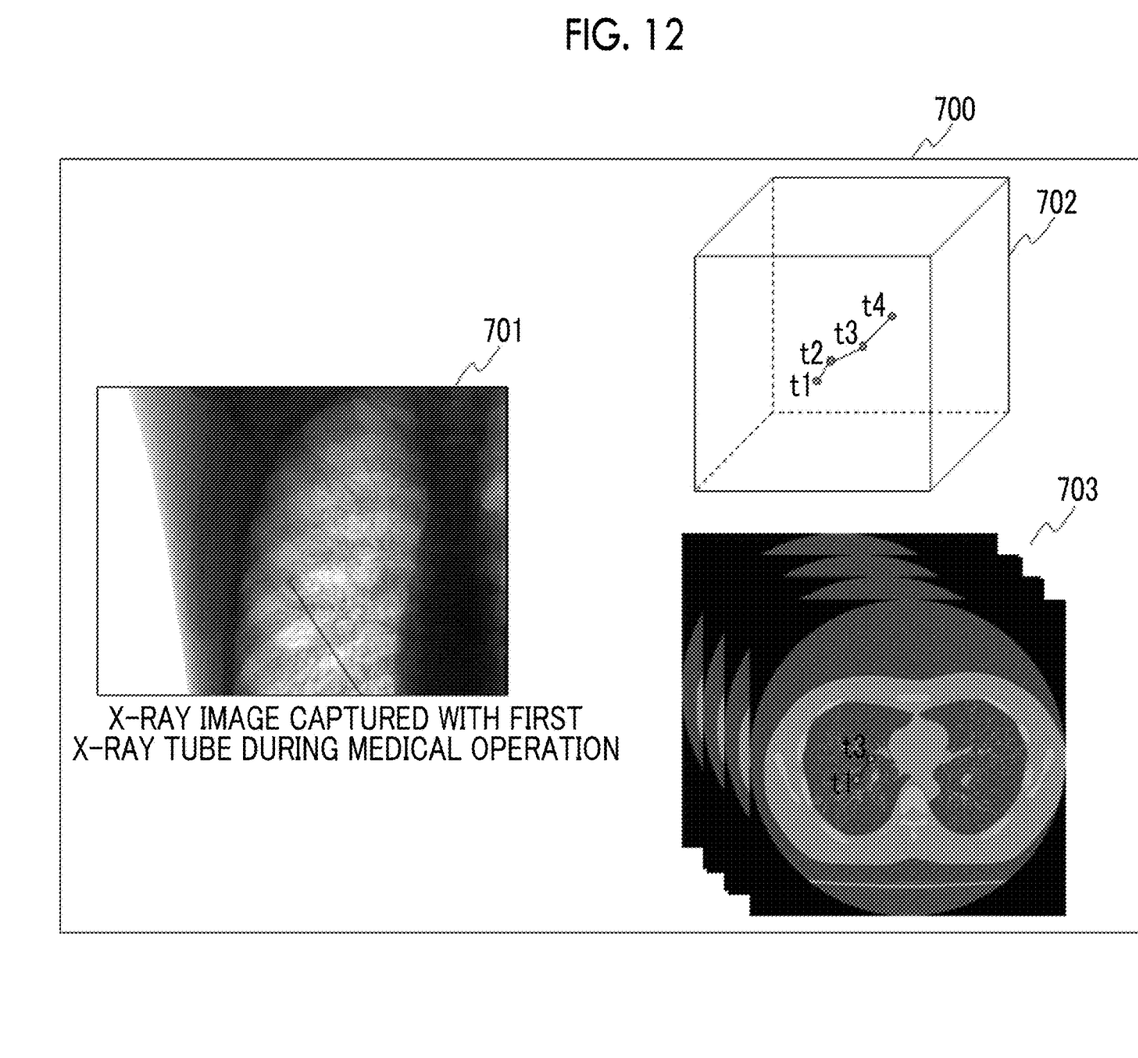
FIG. 12 is a diagram showing an example of a screen displayed on a display unit of the X-ray imaging apparatus 2 according to Embodiment 2.

The pre-captured three-dimensional image is converted into the real space coordinates by using the parameter for associating the coordinate system of the pre-captured three-dimensional image obtained in step S808 with the real space coordinates, and then the two-dimensional projection is performed in a direction desired by the operator to calculate a computational projection image 703. The position of the feature part of the treatment tool calculated in step S611 is overlapped on the calculated computational projection image 703, and is displayed as shown in FIG. 12.

With the X-ray imaging apparatus 2 according to Embodiment 2, the position of the feature part of the treatment tool recognized in real time can be shown on the two-dimensional projection image obtained by projecting the pre-captured three-dimensional image in the direction designated by the operator, and the correspondence between the position of the feature part of the treatment tool and the anatomical structure of the subject can be easily understood.

EXPLANATION OF REFERENCES

1: X-ray imaging apparatus
2: X-ray imaging apparatus
10: stand
20: column support arm
30: support frame
40: top plate
50: column
51: first slide mechanism,
52: second slide mechanism
53: first rotation mechanism
60: first X-ray tube
61: optical axis
70: X-ray detector
90: first X-ray support arm
101: subject
103: computational projection image
110: second X-ray tube
120: first column
121: up-down moving mechanism
122: third slide mechanism
123: second rotation mechanism
130: second column
140: operation unit
141: X-ray image generation unit
142: feature part extraction unit
143: three-dimensional position calculation unit
144: three-dimensional image acquisition unit
145: two-dimensional projection image creation unit
146: image registration unit
150: operation controller
151: drive controller
152: output controller
153: high-voltage generator
154: data collection unit
160: display unit
170: medical image server
222: inclination mechanism
223: raising and lowering mechanism
224: moving mechanism
701: first X-ray image
702: three-dimensional image
703: computational projection image

What is claimed is:

1. An X-ray imaging apparatus comprising:
a top plate on which a subject is placed;
a first X-ray tube that irradiates the subject with X-rays;
a first column that supports the first X-ray tube;
a second X-ray tube that irradiates the subject with X-rays;
a second column that supports the second X-ray tube;
an X-ray detector that detects the X-rays that are applied from the first X-ray tube and the second X-ray tube and are transmitted through the subject; and
an operation unit,
wherein the second X-ray tube is disposed at a position shifted from an optical axis of the first X-ray tube by the second column,
at least one of the second column or the first column is provided with a drive mechanism that changes a relative position of the second X-ray tube with respect to the first X-ray tube and/or a relative position of the second X-ray tube with respect to the X-ray detector, and
the operation unit acquires a first X-ray image from output of the X-ray detector that has detected the X-rays applied from the first X-ray tube, acquires a second X-ray image from output of the X-ray detector that has detected the X-rays applied from the second X-ray tube, and uses a position of an image of a predetermined feature part included in the first X-ray image and a position of an image of the feature part included in the second X-ray image to calculate a three-dimensional position of the image of the predetermined feature part.

2. The X-ray imaging apparatus according to claim 1, wherein the second column supports the second X-ray tube at a position closer to the subject than the first X-ray tube.

3. The X-ray imaging apparatus according to claim 1, wherein a maximum irradiation region of the X-rays from the second X-ray tube to the X-ray detector is smaller than a maximum irradiation region of the X-rays from the first X-ray tube to the X-ray detector.

4. The X-ray imaging apparatus according to claim 1, wherein maximum output of the X-rays from the second X-ray tube is smaller than maximum output of the X-rays from the first X-ray tube.

5. The X-ray imaging apparatus according to claim 4, further comprising:
an output controller that controls output of the first X-ray tube and output of the second X-ray tube,
wherein the output controller is configured to individually control the output of the first X-ray tube and the output of the second X-ray tube.

6. The X-ray imaging apparatus according to claim 1, wherein the operation unit includes an extraction unit that extracts and detects the images of the predetermined feature part included in the first X-ray image and the second X-ray image, and a three-dimensional position calculation unit that calculates a three-dimensional position of the feature part by using the positions of the images of the feature part included in the first X-ray image and the second X-ray image.

7. The X-ray imaging apparatus according to claim 1, further comprising:
a drive controller that controls the drive mechanism,
wherein, in a case in which the positions of the images of the feature part acquired in time series by the operation unit are moved, the drive controller operates the drive mechanism to change at least one of a position, a distance, or an X-ray irradiation direction of the second X-ray tube with respect to the subject, and causes an irradiation region of the X-rays from the second X-ray tube to the subject to track the movement of the images of the feature part.

8. The X-ray imaging apparatus according to claim 1, wherein the second column is supported by the first column.

9. The X-ray imaging apparatus according to claim 1, wherein the operation unit calculates a two-dimensional projection image onto which a three-dimensional image captured in advance is projected, and overlaps and displays the position of the image of the predetermined feature part on the two-dimensional projection image.

10. An X-ray imaging method comprising:
acquiring a first X-ray image by irradiating a subject with X-rays from a first X-ray tube supported by a first column and detecting the X-rays transmitted through the subject by an X-ray detector;
acquiring a second X-ray image by irradiating the subject with X-rays from a second X-ray tube supported by a second column at a position shifted from an optical axis of the first X-ray tube and detecting the X-rays transmitted through the subject by the X-ray detector; and
using a position of an image of a predetermined feature part included in the first X-ray image and a position of an image of the feature part included in the second X-ray image to calculate a three-dimensional position of the image of the predetermined feature part.

* * * * *